(12) United States Patent
Gardner et al.

(10) Patent No.: US 9,715,590 B2
(45) Date of Patent: **\*Jul. 25, 2017**

(54) SYSTEM AND DEVICE FOR VERIFYING THE INTEGRITY OF A SYSTEM FROM ITS SUBCOMPONENTS

(71) Applicant: Analog Devices, Inc., Norwood, MA (US)

(72) Inventors: Douglas J. Gardner, Tampa, FL (US); John J. Walsh, Tampa, FL (US); John Ross Wallrabenstein, West Lafayette, IN (US)

(73) Assignee: Analog Devices, Inc., Norwood, MA (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/704,947

(22) Filed: May 5, 2015

(65) Prior Publication Data
US 2015/0317480 A1    Nov. 5, 2015

Related U.S. Application Data

(60) Provisional application No. 62/150,586, filed on Apr. 21, 2015, provisional application No. 62/150,254, filed on Apr. 20, 2015, provisional application No. 62/128,920, filed on Mar. 5, 2015, provisional application No. 61/988,848, filed on May 5, 2014.

(51) Int. Cl.
*G06F 21/57* (2013.01)
*H04L 9/32* (2006.01)

(52) U.S. Cl.
CPC ............. *G06F 21/57* (2013.01); *H04L 9/32* (2013.01); *H04L 9/3221* (2013.01); *G06F 2221/034* (2013.01); *G06F 2221/2105* (2013.01); *G06F 2221/2153* (2013.01)

(58) Field of Classification Search
None
See application file for complete search history.

(56) References Cited

U.S. PATENT DOCUMENTS

| | | | |
|---|---|---|---|
| 8,290,150 B2 | 10/2012 | Erhart et al. | |
| 8,625,788 B2 * | 1/2014 | Pendakur | G06F 21/123 380/200 |
| 8,782,396 B2 | 7/2014 | Ziola et al. | |

(Continued)

OTHER PUBLICATIONS

International Search Report and Written Opinion for International Application No. PCT/US16/21264 mailed Jun. 3, 2016.

(Continued)

*Primary Examiner* — Kenny Lin
(74) *Attorney, Agent, or Firm* — Wolf, Greenfield & Sacks, P.C.

(57) ABSTRACT

A system and device for verifying the integrity of a system from its subcomponents, the system comprising a plurality of subcomponents each having a physical state, the system and the device comprising a processor that is connected to each of the subcomponents, the processor configured to verify systemic integrity by performing verification on some or all specified subcomponents. The verification may be individual (1,1) or threshold (n,1), and may be interactive or non-interactive.

18 Claims, 2 Drawing Sheets

(56) References Cited

U.S. PATENT DOCUMENTS

| | | | |
|---|---|---|---|
| 8,918,647 B1* | 12/2014 | Wallrabenstein | ... H04L 63/0853 713/159 |
| 9,032,476 B2 | 5/2015 | Potkonjak | |
| 2003/0204743 A1 | 10/2003 | Devadas et al. | |
| 2008/0133912 A1 | 6/2008 | Yamamoto et al. | |
| 2008/0256600 A1 | 10/2008 | Schrijen et al. | |
| 2010/0037056 A1 | 2/2010 | Follis et al. | |
| 2010/0122093 A1* | 5/2010 | Tuyls | ... G06F 21/33 713/180 |
| 2011/0099117 A1 | 4/2011 | Schepers et al. | |
| 2011/0191837 A1 | 8/2011 | Guajardo Merchan et al. | |
| 2012/0124385 A1* | 5/2012 | Klasen | ... H04L 9/3236 713/179 |
| 2013/0051552 A1 | 2/2013 | Handschuh et al. | |
| 2013/0142329 A1 | 6/2013 | Bell et al. | |
| 2013/0198838 A1* | 8/2013 | Schmidt | ... H04L 9/3234 726/22 |
| 2014/0093074 A1 | 4/2014 | Gotze et al. | |
| 2014/0108786 A1 | 4/2014 | Kreft | |
| 2014/0189890 A1 | 7/2014 | Koeberl et al. | |
| 2015/0058928 A1 | 2/2015 | Guo et al. | |
| 2015/0095655 A1* | 4/2015 | Sherman | ... G06F 21/44 713/189 |
| 2016/0269186 A1* | 9/2016 | Wallrabenstein | ... G06F 21/31 |
| 2017/0063559 A1* | 3/2017 | Wallrabenstein | ... H04L 9/3278 |

OTHER PUBLICATIONS

Asim et al., "Physical Unclonable Functions and Their Applications to Vehicle System Security," Vehicular Technology Conference, VTC Spring 2009, IEEE 69th.

Rigaud (editor) in "D3.1 Report on Protocol choice and implementation," Holistic Approaches for Integrity of ICT-Systems (2014).

Ibrahim et al., "Cyber-physical security using system-level pufs," Wireless Communications and Mobile Computing Conference (IWCMC), 2011 7th Int'l, IEEE.

Peeters, "Security Architecture for Things That Think," Diss. Ph. D. thesis, KU Leuven, Jun. 2012.

Peeters et al., "Toward More Secure and Reliable Access Control," Pervasive Computing, IEEE 11:3 (IEEE Computer Society 2011).

Krzywiecki et al., "Coalition resistant anonymous broadcast encryption scheme based on PUF," Trust and Trustworthy Computing (Springer Berlin Heidelberg 2011).

Khoshroo et al., "Design and Evaluation of FPGA-based Hybrid Physically Unclonable Functions," Master Thesis (Western University, Ontario, 2013).

Ruan et al., "Elliptic curve ELGamal threshold-based key management scheme against compromise of distributed RSUs for VANETs," Journal of Information Processing 20:4 (2012) (electronic pre-print).

Duc et al., "A survey on RFID security and provably secure grouping-proof protocols," Int'l J. Internet Tech. and Secured Transactions, 2:3/4 (2010).

Ertaul et al., "ECC Based Threshold Cryptography for Secure Data Forwarding and Secure Key Exchange in Manet (I)," Networking 2005, 4th Int'l IFIP-TC6 Networking Conference, Waterloo, Canada (Springer Berlin Heidelberg 2005).

Pfaffhauser, "Protocols for MPC based on Unclonability," Master Thesis (ETH Zurich 2011).

Garcia-Alfaro, "Security Threat Mitigation Trends in Low-cost RFID Systems," Data Privacy Management and Autonomous Spontaneous Security (Springer Berlin Heidelberg 2010).

Krzywiecki et al., "Collusion Resistant Anonymous Broadcast Encryption Scheme based on PUF," Trust 2011, Pittsburgh.

Feiri et al., "Efficient and Secure Storage of Private Keys for Pseudonymous Vehicular Communication", Nov. 2013, ACM, pp. 9-18.

Sadeghi et al., Short Paper: Lightweight Remote Attestation using Physical Functions, Jun. 2011, ACM, pp. 109-114.

Owusu et al., "OASIS: On Achieving a Sanctuary for Integrity and Secrecy on Untrusted Platforms", ACM, pp. 13-24.

Frikken et al., "Robust Authentication using Physically Unclonable Functions," Information Security, vol. 5735 of Lecture Notes in Computer Science, pp. 262-277 (Springer 2009).

Owoskin et al., "Hardware-rooted Trust for Secure Key Management and Transient Trust," Proceedings of the 14th ACM Conference: Computer & Communication Security, pp. 389-400.

Gardner et al., "Toward Trusted Embedded Systems," 2nd Annual NSA Trusted Computing Conference & Exposition, Sep. 21, 2011, Orlando, FL.

* cited by examiner

SYSTEM AND DEVICE FOR VERIFYING THE INTEGRITY OF A SYSTEM FROM ITS SUBCOMPONENTS

REFERENCE TO RELATED APPLICATIONS

This application claims the benefit of the priority of and incorporates by reference U.S. Provisional Patent Application Ser. No. 61/988,848 filed May 5, 2014 ("the '848 application"), Ser. No. 62/128,920 filed Mar. 5, 2015 ("the '920 application"), and Ser. No. 62/150,586 filed Apr. 21, 2015 ("the '586 application"), and claims the benefit of the priority of U.S. Provisional Patent Application Ser. No. 62/150,254 filed Apr. 20, 2015.

FIELD OF THE INVENTION

The present invention relates to integrity verification of systems comprising electronic subcomponents.

BACKGROUND OF THE INVENTION

In many applications, it can be useful to employ means for verifying the integrity of a system by interrogating the subcomponents it is composed of. For example, a weapon system may require subcomponents to be internally validated during a boot process, or a vehicle may validate critical electronic control units on startup. Prior art typically accomplishes the verification of a sub-component through a demonstration that it possesses a secret value, for example, through a zero knowledge proof of knowledge. This method of verification, however, may be associated with one or more constraints relating to hardware integrity or the security of private information. As to hardware integrity, existing sub-component authentication protocols only verify that an entity possesses a private value, and typically just infer hardware integrity if the device has a physical construction designed to deter tampering (e.g., a hardware security module). Even with a tamper resistant physical construction, the integrity of the physical construction is not inextricably linked to the integrity of the device itself. As to the security of private information, existing sub-component authentication protocols require that the sub-component store and protect private information (typically a private key for cryptographic authentication protocols). If the private information is compromised, it may be possible for an adversary to masquerade as a valid sub-component in the larger system.

Asim et al. ('Physical Unclonable Functions and Their Applications to Vehicle System Security,' Vehicular Technology Conference, VTC Spring 2009, IEEE 69th) discusses using PUFs in vehicle components as a method for regenerating private keys, which is a well-known application. However, they fail to give an enabling construction allowing a system-wide identity to be constructed from each of the individual components.

Rigaud (editor) in "D3.1 Report on Protocol choice and implementation," Holistic Approaches for Integrity of ICT-Systems (2014) describes applying PUFs to chips as a method for authenticating a chip (the device-under-test) to the testing equipment, which could detect fake chips. However, there is no construction that would enable a system-wide identity to be constructed from each of the individual chips.

Ibrahim et al. ("Cyber-physical security using system-level pufs," Wireless Communications and Mobile Computing Conference (IWCMC), 2011 7th Intl, IEEE) discusses the general concept of combining PUFs from distinct system components to form a combined identity, but they fail to give an enabling construction. In their concluding remarks, the authors specifically state that they lack a realized solution.

Peeters ("Security Architecture for Things That Think," Diss. Ph. D. thesis, KU Leuven, June 2012) describes using a PUF in resource-constrained devices for regenerating a share from an external threshold system composed of a user's devices. The PUF is applied solely as a storage mechanism, eliminating the need to store the share in plaintext on the device. However, no internal threshold application is given, nor is the challenge-helper pair ever refreshed.

Krzywiecki et al. ("Coalition resistant anonymous broadcast encryption scheme based on PUF," Trust and Trustworthy Computing. Springer Berlin Heidelberg, 2011, 48-62) describe a broadcast encryption scheme where subscribers must invoke a PUF-enabled card to regenerate shares of a threshold system. The construction requires an incorruptible distributor to store and protect raw PUF output. The system is designed to allow an end device to recover a symmetric key only if it has not been revoked by the broadcaster. The PUF-enabled receiving device must construct the full symmetric key from its shares in order to decrypt the incoming transmission. No internal threshold application is given, nor is the challenge-helper pair ever refreshed.

Khoshroo et al. ("Design and Evaluation of FPGA-based Hybrid Physically Unclonable Functions," Diss. Western University London, 2013) describe a modified secret sharing scheme, where each player's share is a challenge-helper pair generated from the dealer's PUF. The actual shares for the threshold system are recovered only given both the challenge-helper pair and access to the PUF, which regenerates the share from the challenge-helper pair. As each share is worthless without access to the PUF, an adversary can compromise all of the end devices, and yet is unable to recover the secret without access to the PUF. No cryptographic operations are possible over these pseudo-shares. The shared secret may only be recovered if all of the shares are regenerated, and the dealer is assumed to be incorruptible. The dealer's PUF is used only as a method for obfuscating the shares that are distributed to players.

SUMMARY OF THE INVENTION

Various embodiments of the invention provide for the verification of a set of subcomponents of an electronic system, such that the integrity of the system as a whole is deduced therefrom. One embodiment of the invention employs physical unclonable functions (PUFs) for detecting hardware tampering in integrated circuits (ICs), and zero knowledge proof protocols for authentication. In one embodiment this is done by individual verification of sub-components; in another embodiment, relevant sub-components may be verified together, with each generating a local proof of validity and collaborating to combine their local proofs into a single proof that validates the integrity of the system as a whole.

In another embodiment, which may be provided individually or in combination with one or more of the foregoing embodiments, systemic trust may be established even if the system's sub-components themselves are untrusted, by employing a hardware root-of-trust that iteratively extends the trust boundary as each sub-component is verified.

DETAILED DESCRIPTION OF EMBODIMENTS

Figure 1:
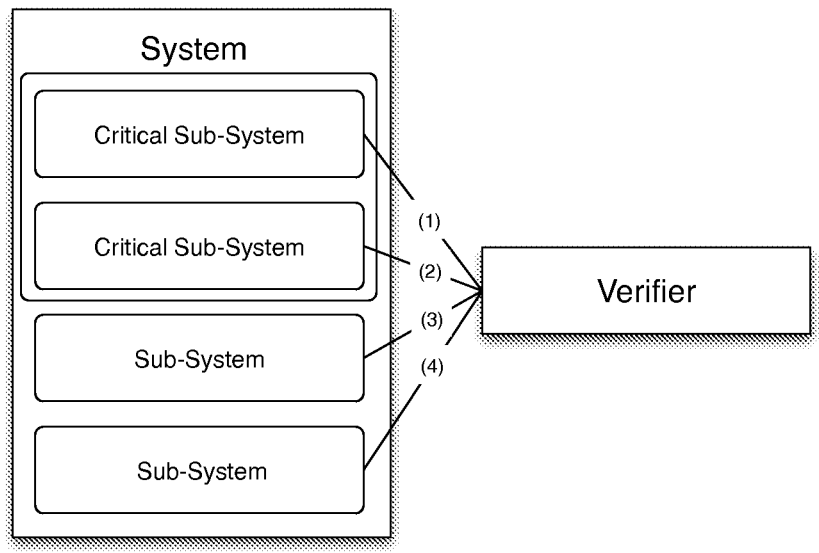
FIG. 1 is a system diagram illustrating (1, 1) integrity verification of sub-components.

In one embodiment, each of a system's n relevant sub-components may be interrogated (e.g., sequentially) through an interactive or non-interactive zero-knowledge proof of knowledge. Authentication algorithms such as those disclosed in the '848 and '586 applications (elliptic curve-based) or in U.S. Pat. No. 8,918,647 (discrete log-based; "the '647 patent," which is incorporated here by reference), for example, may be used to establish the hardware integrity of components having trusted means of gathering private information, such as physical unclonable functions. A PUF links the evaluation of a function with the hardware on which it is executed, such that any adversarial tampering of the hardware affects the evaluation of the function. By further linking the PUF output with the construction of the zero knowledge proof, the hardware integrity of the device can be deduced by an external verifier from its ability to successfully complete the zero knowledge proof protocol. The PUF may also be configured to dynamically generate private information from only public information, so that sub-components need not store and protect private information. In another embodiment, integrity of the system may be established through a single collaborative response from all (or a subset of) the subcomponents by constructing a threshold proof that requires all or some subset of the n subcomponents to be functioning correctly. In that case, rather than construct a separate proof for each of the n components, they collaboratively construct a single proof that establishes the validity of all or a subset of the n components simultaneously.

Subcomponent Authentication

In the individual interrogation method of verification, or "(1, 1) verification," each subcomponent interacts directly with the verifier V. In interactive (1, 1) verification, the verifier V issues a nonce as part of a two message protocol with each subcomponent. In non-interactive (1, 1) verification, each subcomponent sends only a single message to the verifier V, and includes a value equivalent to a nonce (e.g., a timestamp) that cannot be manipulated by the subcomponent. In the collaborative method of verification, or "(n, 1) verification," a subset of the n subcomponents collaboratively generate a single joint proof, which convinces the verifier V of the integrity of the subset of n subcomponents. In interactive (n, 1) verification, the verifier V issues a nonce as part of a two message protocol, where a subset of subcomponents act jointly and send only a single response. In non-interactive (n, 1) verification, a subset of subcomponents send only a single message to the verifier V, which includes a value equivalent to a nonce (e.g., a timestamp) that cannot be manipulated by any subset of the subcomponents.

For the purposes of providing a detailed description of an embodiment, the example of an elliptic curve-based construction is utilized, with E denoting an elliptic curve defined over a finite field $\mathbb{F}$. where G is a base point of order q. One of ordinary skill will recognize that the invention (be it (1, 1), (n, 1), and/or layered security) can be readily implemented using various other constructions (with just one example alternative being the '647 patent's discrete logarithm construction). Thus the invention is not limited to any particular construction, except where specifically stated in the claims.

A zero knowledge authentication protocol typically requires a unique and random nonce to be issued by the verifier V during each protocol invocation. The nonce prevents the proof from the verifier from being reused in the future (i.e., a replay attack), and the proving subcomponent must not be able to influence its value. For example, the '848 application discloses a derived token-based zero knowledge proof protocol, the teachings regarding which are incorporated here by reference, summarized as follows:

---
Interactive Authentication Algorithm for an Individual Device for Server s do
   Device d ← {c, E, G, p, q, P, N} where N is a nonce and P is the helper string
for PUF Device d do
   x ← Hash(c, E, G, p, q)
   $p_i^{priv}$ ← D(PUF(x) ⊕ P) where PUF(•) is the PUF function and D is an error decoding scheme
   r ← random ∈ $\mathbb{F}_q$, a random group element
   B ← r · G mod p
   c' ← Hash(G, B, A, N), (a hash, not a challenge)
   m ← r + c' · $p_i^{priv}$ mod q
   Server s ← {B, m}
for Server s do
   c' ← Hash(G, B, A, N)
   D ← m · G − c' · A mod p $$\text{Device } d \leftarrow \begin{cases} \text{accept}: & D = B \\ \text{deny}: & D \neq B \end{cases}$$

---

This algorithm proceeds as follows:

Prior to authentication, the server has issued a random challenge variable c to the device, which is used to form a PUF challenge input x. The enrollment server and device agree on an elliptic curve E defined over a finite field $\mathbb{F}_p$ where G is a base point of order q. The device $d_i$ returns a public commitment A=$p_i^{priv}$ · G to the server, which links its PUF to the challenge variable c (on which the challenge input x depends), and a public helper value P that will correct the noisy PUF output.

When the server wishes to authenticate the device, it issues an authentication request and the tuple {c, E, G, p, q, P, N} is sent to the device.

The device constructs the PUF challenge input x←H (c, E, G, p, q), which links the challenge variable c with the public parameters of the elliptic curve, and passes it to the PUF yielding output O', which is ⊕'d with helper value P and the result decoded using an error decoding scheme D.

As the PUF output is noisy, when queried on challenge x again in the future, the new output O' may not exactly match the previous output value O. However, it is assumed that O and O' will be t-close with respect to some distance metric (e.g. Hamming distance). Thus, an error correcting code may be applied to the PUF output such that at most t errors will still recover O. During enrollment, error correction was applied over the random group element $p_i^{priv}$, and then this value was blinded with the output of the PUF O, so that the final helper value P=ECC($p_i^{priv}$)⊕O reveals no information about $p_i^{priv}$. During recovery for authentication, computing the exclusive- or of ECC(rand)⊕O⊕O' will return $p_i^{priv}$ whenever O and O' are t-close. This process is referred to as fuzzy extraction, and is detailed further in the '848 application (see "Gen Algorithm,", "Rep Algorithm," and Definition 3).

The device chooses a random group element $r \in \mathbb{F}_q$ and computes point $B = r \cdot C$.

The server's nonce N is linked to the proof by constructing a hash c' that also combines the base point G, the device's nonce B, and its public key A.

The device constructs the zero knowledge proof token (B, $m = r + c' \cdot p_i^{priv} \mod p$), and returns this tuple to the server. The server verifies that:

$$\{(m \cdot G) - (c' \cdot A)\} = \{((r + c' \cdot p_i^{priv}) \cdot G) - (c' \cdot p_i^{priv} \cdot G)\}$$
$$= \{r \cdot G + 'c \cdot p_i^{priv} \cdot G - 'c \cdot p_i^{priv} \cdot G\}$$
$$= r \cdot G$$
$$= B$$

(1, 1) Verification

In (1, 1) verification, the verifier individually interrogates each subcomponent in order to establish the integrity of the larger system; all (or all specified) subcomponents successfully complete a zero knowledge proof with the verifier in order for the verification of the integrity of the system as a whole to succeed. Referring to FIG. 1, the verifier is illustrated sequentially validating each of the system's sub-components. At first verification 1 and second verification 2, the verifier validates each critical sub-system component. At third verification 3 and fourth verification 4, the verifier validates each non-critical sub-system component. An interactive version of this process is set forth in Algorithm 1.

---
Algorithm 1 Interactive (1, 1) System Verification
--- for each Subcomponent Device $d_i \in \bar{\mathcal{D}}$ do
    for Verifier $\mathcal{V}$ do
        $d_i \leftarrow \{c_i, G, p, P_i, N_i\}$ where $N_i$ is a nonce and $P_i$ is the helper string
    $x_i \leftarrow \text{Hash}(c_i, E, G, n)$
    $p_i^{priv} \leftarrow D(\text{PUF}(x_i) \oplus P_i)$ where PUF(•) is the PUF output function and D is an error decoding scheme
    $A_i = p_i^{priv} \cdot G \mod p$
    $r_i \leftarrow \text{random} \in \mathbb{F}_q$, a random group element
    $B_i \leftarrow r_i \cdot G \mod p$
    $c_i' \leftarrow \text{Hash}(G, B_i, A_i, N_i)$
    $m_i \leftarrow r_i + c_i' \cdot p_i^{priv} \mod q$
    Verifier $\mathcal{V} \leftarrow \{B_i, m_i\}$
    for Verifier $\mathcal{V}$ do
        $A_i = p_i^{priv} \cdot G \mod p$ (stored from device enrollment)
        $c_i' \leftarrow \text{Hash}(G, B_i, A_i, N_i)$
        $D_i \leftarrow m_i \cdot G - c_i' \cdot A_i \mod p$ Subcomponent Device $d_i \leftarrow \begin{cases} \text{accept}: & D_i = B_i \\ \text{deny}: & D_i \neq B_i \end{cases}$ for Verifier $\mathcal{V}$ do $\text{System} \leftarrow \begin{cases} \text{accept}: & \forall i, D_i = B_i \\ \text{deny}: & \exists i \text{ s.t. } D_i \neq B_i \end{cases}$

---

The requirement for communication from the verifier V in the interactive zero knowledge proof is to obtain a nonce value specific to the current proof. This prevents an eavesdropping adversary from using previous proofs from a valid subcomponent to successfully complete an authentication protocol and masquerade as a valid subcomponent. A non-interactive zero knowledge proof removes this communication requirement. A non-interactive version of Algorithm 1 can be made by configuring the subcomponent to generate a nonce in a manner that prevents the proving subcomponent from manipulating the proof. To accomplish this, the subcomponent device $d_i$ constructs the nonce $N \leftarrow \text{Hash}(p_i^{priv} \cdot G \mod p \| \tau)$ where $\tau$ is a timestamp and $\|$ denotes concatenation. The timestamp ensures that previous proofs constructed by the proving subcomponent cannot be replayed by an adversary in the future, while the hash function ensures that the proving subcomponent cannot manipulate the challenge in an adversarial manner. The verifier preferably checks that the timestamp is reasonably current (e.g., second granularity) and monotonically increasing to prevent replay attacks. Alternately, globally-synchronized clocks may be used rather than a timestamp, such as if network latency is not significant. A non-interactive version of (1, 1) verification is set forth in Algorithm 2, with each sub-component locally choosing a current timestamp $\tau$ to construct its nonce.

---
Algorithm 2 Non-Interactive (1, 1) System Verification
--- for each Subcomponent Device $d_i \in \bar{\mathcal{D}}$ do
    $x_i \leftarrow \text{Hash}(c_i, E, G, n)$
    $p_i^{priv} \leftarrow D(\text{PUF}(x_i) \oplus P_i)$ where PUF(•) is the PUF output function and D is an error decoding scheme
    $A_i = p_i^{priv} \cdot G \mod p$
    $r_i \leftarrow \text{random} \in \mathbb{F}_n$, a random group element
    $B_i \leftarrow r_i \cdot G \mod p$
    $N_i \leftarrow \text{Hash}(A\|\tau)$ where $\tau$ is the current timestamp
    $c_i' \leftarrow \text{Hash}(G, B_i, A_i, N_i)$
    $m_i \leftarrow r_i + c_i' \cdot p_i^{priv} \mod q$
    Verifer $\mathcal{V} \leftarrow \{B_i, m_i, \tau\}$
    for Verifier $\mathcal{V}$ do
        $A_i = p_i^{priv} \cdot G \mod p$ (stored from device enrollment)
        $N_i \leftarrow \text{Hash}(A\|\tau)$
        $c_i' \leftarrow \text{Hash}(G, B_i, A_i, N_i)$
        $D_i \leftarrow m_i \cdot G - c_i' \cdot A_i \mod p$ Subcomponent Device $d_i \leftarrow \begin{cases} \text{accept}: & D_i = B_i \wedge \text{check}(\tau) \\ \text{deny}: & D_i \neq B_i \vee !\text{check}(\tau) \end{cases}$ for Verifier $\mathcal{V}$ do $\text{System} \leftarrow \begin{cases} \text{accept}: & \forall i, D_i = B_i \wedge \text{check}(\tau_i) \\ \text{deny}: & \exists i \text{ s.t. } D_i \neq B_i \vee !\text{check}(\tau_i) \end{cases}$

---

(n, 1) Verification

Figure 2:
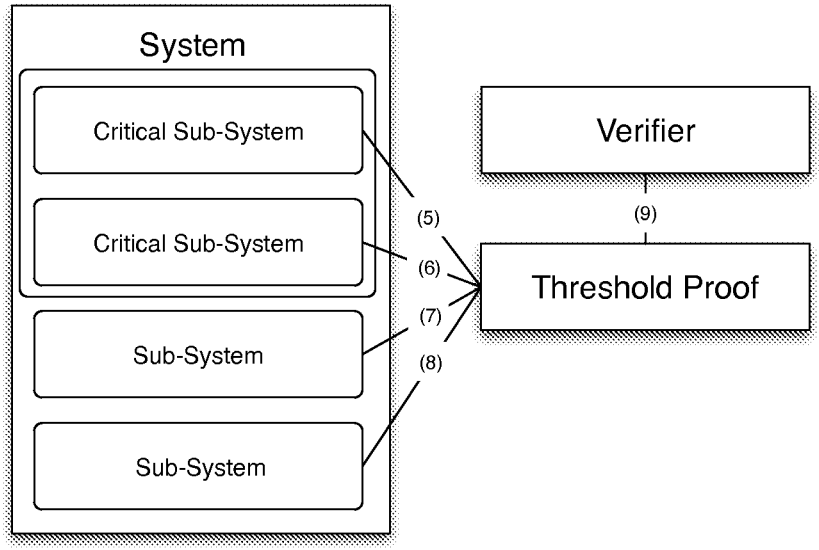
FIG. 2 is a system diagram illustrating (n, 1) integrity verification of sub-components.

Referring now to FIG. 2, an external entity, denoted Verifier, would like to verify that all critical subsystems are functioning properly, and/or to verify the system as a whole, as satisfied by some fraction of non-critical or redundant subsystems functioning properly. In a threshold (n, 1) approach, the verifier establishes the integrity of the larger system from a single joint proof constructed by combining local proofs from each sub-component. At first threshold proof 5 and second threshold proof 6, the critical sub-components contribute their local proofs. At third threshold proof 7 and fourth threshold proof 8, the remaining sub-components contribute their local proofs to form a single, joint proof. At combined verification 9 the Verifier validates the joint proof (such as by Algorithm 6) to establish the validity of the system as a whole.

One method for verifying a set of critical and non-critical components is to generate a separate sharing for each set. This naïve approach requires the verifier to check two proofs: one generated by the critical components, and another generated by the non-critical components. However, a more efficient method for combining both critical and non-critical components would be to generate a single proof that represents both component groups. In fact, a single proof that enforces all critical components and a subset of non-critical components may be constructed by properly distributing shares. This more efficient approach differs from the simpler naïve approach, where x critical components form a (x,x) sharing, and the y non-critical components form a (z,y) sharing, where z<y. As a concrete example, assume there are two critical components (both of which must be operational) and two non-critical components (at least one of which must be operational). A (5, 6) sharing is constructed, where each critical component receives two shares, and each non-critical component receives one share. If one of the critical components fails, there are only four shares between the remaining critical component and the two non-critical components. Similarly, if both of the non-critical components fail, there are only four shares between the two operational critical components. However, with both critical components and at least one non-critical component functioning, the necessary five shares may be recovered to correctly construct the proof. Thus, a set of requirements for critical and non-critical components can be satisfied with a single proof by properly allocating shares of the (t,n) system.

Referring to the threshold methods disclosed in the '920 application, which are incorporated by reference, for example, to satisfy the requirement that all k critical subsystems (k=2 in FIG. 2) are functioning properly, a (k,k) sharing can be constructed such that all k subsystems must collaborate to complete a single zero knowledge proof. Thus, the verifier only needs to verify a single zero knowledge proof in order to authenticate and verify a set of k critical components. Similarly, a (t,n) sharing can be constructed for redundant systems, such that t of the n redundant subsystems must be functioning to complete the zero knowledge proof. Thus, rather than complete O(n) zero knowledge proofs for n subsystems, the subsystems can jointly construct a single threshold zero knowledge proof to represent the system they compose.

Algorithm 3 illustrates an example of a subset of subcomponent devices $\bar{D} \subseteq D, |\bar{D}|=m \leq n$ constructing a joint threshold zero knowledge proof for the verifier V. Although in this example the verifier combines the partial zero knowledge proofs (thus, implying O(n) work for V as the number of partial proofs is n), a secretary could instead combine the partial shares and forward the result to the verifier. As another alternative, the subcomponents could form a ring, and pass their partial shares to the next subcomponent, which combines their own partial proof before forwarding on to the next subcomponent. The Enrollment Algorithm, Distributed Key Generation Algorithm, and PUF-Retrieve are set forth in the '920 application.

---

Algorithm 3 Interactive Threshold Proof Construction

Goal: Perform threshold zero knowledge proof at time $\tau$
One-Time Setup Stage
for each Subsystem Device $d_i \in \bar{\mathcal{D}}$ do
  Run Enrollment Algorithm
  Run Distributed Key Generation Algorithm
Evaluation Stage
for Verifier $\mathcal{V}$ do
  Broadcast ephemeral nonce N to all $d_i \in \bar{\mathcal{D}}$
  for all Participants $p_i \in \mathcal{P}$ do
    Recover share $r_i \leftarrow$ PUF-Retrieve($c_i$, helper$_i$)
    Choose a random $y_i \in \mathbb{F}_q$
    Compute and broadcast $B_i = y_i \cdot G$ mod p to all $d_i \in \bar{\mathcal{D}}$
    Compute

---

Algorithm 3 Interactive Threshold Proof Construction $$B = y \cdot G = \sum_{i=1}^{t} B_i \bmod p$$

$$e = \text{Hash}(G, B, \mathcal{P}^{pub}, N)$$

$$M_i = y_i + r_i e \left( \prod_{\substack{j=1 \\ j \neq i}}^{t} \frac{-j}{i-j} \right) \bmod q$$

Send ($B_i$, $M_i$) to verifier $\mathcal{V}$

---

Similarly, Algorithm 3 can be performed non-interactively. This is accomplished by replacing the verifier's nonce N with a timestamp $\tau$ generated by the components, as illustrated in Algorithm 4. The timestamp serves as a replacement for the server's randomness N, and prevents replay attacks by adding a temporal requirement to the proof. That is, the timestamp is monotonically increasing, and the verifier simply checks that the timestamp used in the proof is reasonably (e.g., second granularity) current.

---

Algorithm 4 Non-Interactive Threshold Proof Construction

Goal: Perform non-interactive threshold zero knowledge proof at time $\tau$
One-Time Setup Stage
for each Subsystem Device $d_i \in \bar{\mathcal{D}}$ do
  Run Enrollment Algorithm
  Run Distributed Key Generation Algorithm
Evaluation Stage
for all Participants $p_i \in \mathcal{P}$ do
  Fix current timestamp $\tau$
  Recover share $r_i \leftarrow$ PUF-Retrieve($c_i$, helper$_i$)
  Choose a random $y_i \in \mathbb{F}_q$
  Compute and broadcast $B_i = y_i \cdot G$ mod p to all $d_i \in \bar{\mathcal{D}}$
  Compute $$B = y \cdot G = \sum_{i=1}^{t} B_i \bmod p$$

$$e = \text{Hash}(G, B, \mathcal{P}^{pub}, \tau)$$

$$M_i = y_i + r_i e \left( \prod_{\substack{j=1 \\ j \neq i}}^{t} \frac{-j}{i-j} \right) \bmod q$$

Send ($B_i$, $M_i$, $\tau$) to verifier $\mathcal{V}$

---

Algorithm 5 illustrates a further refinement of Algorithm 3 that incorporates updating the challenge-helper pair and share after each operation. The PUF-Share-Update and PUF-Store algorithms are set forth in the '920 application.

---

Algorithm 5 Interactive Threshold Proof Construction with Refreshing

Goal: Perform threshold zero knowledge proof at time $\tau$
One-Time Setup Stage
for each Subsystem Device $d_i \in \bar{\mathcal{D}}$ do
  Run Enrollment Algorithm
  Run Distributed Key Generation Algorithm
Evaluation Stage
for Verifier $\mathcal{V}$ do
  Broadcast ephemeral nonce N to all $d_i \in \bar{\mathcal{D}}$
  for all Participants $p_i \in \mathcal{P}$ do -continued Algorithm 5 Interactive Threshold Proof Construction with Refreshing Recover share $r_i^{(\tau)} \leftarrow$ PUF-Retrieve$(c_i^{(\tau)}, \text{helper}_i^{(\tau)})$
Choose a random $y_i \in \mathbb{F}_q$
Compute and broadcast $B_i = y_i \cdot G \mod p$ to all $d_i \in \tilde{\mathcal{D}}$
Compute $$B = y \cdot G = \sum_{i=1}^{t} B_i \mod p$$

$e = \text{Hash}(G, B, \mathcal{P}^{pub}, N)$ $$M_i = y_i + r_i^{(\tau)} e \left( \prod_{\substack{j=1 \\ j \neq i}}^{t} \frac{-j}{i-j} \right) \mod q$$

Send $(B_i, M_i)$ to verifier $\mathcal{V}$
Update share
  $r_i^{(\tau+1)} \leftarrow$ PUF-Share-Update$(r_i^{(\tau)})$
Store $r_i^{(\tau+1)}$ and update PUF challenge:
  $\{c_i^{(\tau+1)}, \text{helper}_i^{(\tau+1)}\} \leftarrow$ PUF-Store$(r_i^{(\tau+1)})$ Algorithm 6 Interactive Threshold Proof Verification for Verifier $\mathcal{V}$ do
  Upon receipt of $(B_i, M_i)_{1 \leq i \leq t}$, compute:

$$B = \sum_{i=1}^{t} B_i \mod p$$

$$M = \sum_{i=1}^{t} M_i \mod q$$

$e = h(G, B, \mathcal{P}^{pub}, N)$
Verify the proof against the group's public key $\mathcal{P}^{pub} = rG$:

$B \stackrel{?}{=} M \cdot G - e \cdot \mathcal{P}^{pub} \mod p$
$= (y + re) \cdot G - e \cdot (rG)$
$= yG + reG - reG$
$= yG$ $$\text{Decision} \leftarrow \begin{cases} \text{accept}: & B = yG \\ \text{deny}: & B \neq yG \end{cases}$$

Layered Security

Figure 3:
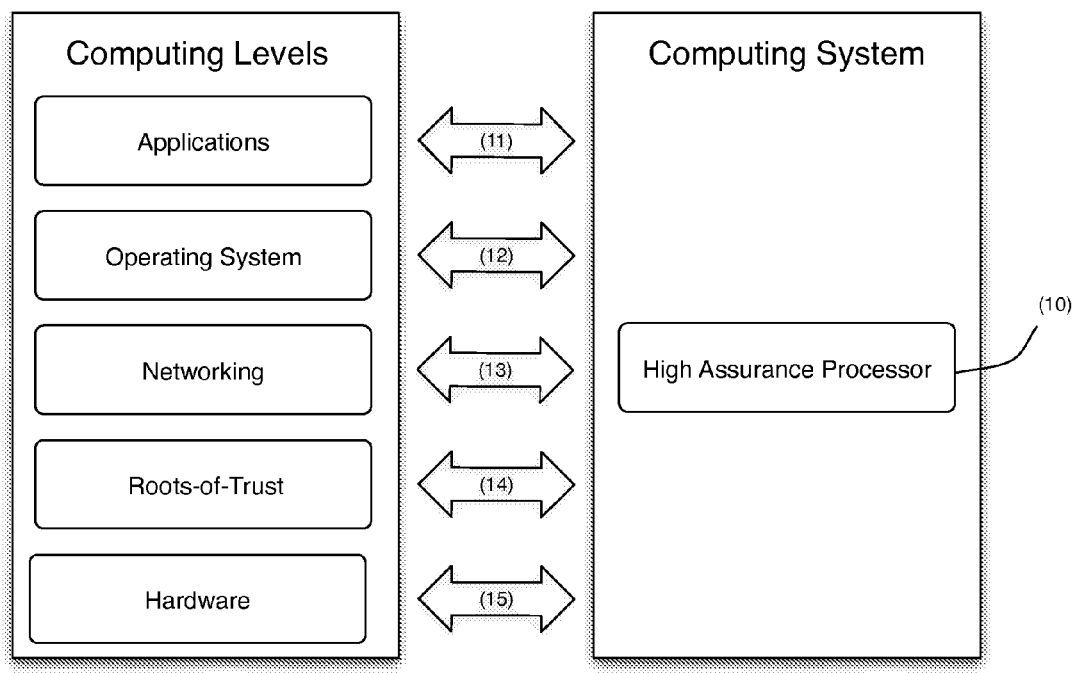
FIG. 3 illustrates a system establishing trust through layered security derived from a high assurance processor.

When the components themselves are unable to generate a proof of correctness, the integrity of the system as a whole must be derived from a root-of-trust. An additional embodiment of the invention is a system achieving a layered security approach across all computing levels by deriving a hardware root-of-trust from a high assurance processor. The high assurance processor is used to validate all layers in a computing architecture, providing secure boot control, change detection, alarm indicators and audit functions. FIG. 3 illustrates the high assurance processor in an exemplary computing architecture.

Secure computing architectures create a layered security approach, where the trusted boundary is iteratively extended from a core root-of-trust. For example, a trusted boot procedure assumes a minimal trust boundary (e.g., a root-of-trust, such as a trusted platform module (TPM)) and iteratively extends the trust boundary by validating each component of the system as it boots. This mitigates risk from components more susceptible to adversarial modification, such as the operating system or applications. The root-of-trust is used to detect modification to system components, and will only complete the boot sequence if all components are validated as correct. However, existing trusted boot systems typically rely on roots-of-trust that are assigned (rather than intrinsic) to the device. For example, TPMs hold a private key in protected memory that represents the identity of the system. Thus, an adversary that extracts the assigned identity is able to masquerade as the system. Further, existing systems do not provide intrinsic tamper detection, and rely on tamper detecting hardware enclosures for security. Existing roots-of-trust are illustrated in FIG. 3 at the root of trust layer 14, which is situated above the hardware layer.

One embodiment of the invention employs a high assurance processor based on a PUF that captures intrinsic and unique properties of the hardware and preferably provides intrinsic hardware tamper detection. As the PUF mapping is a function of the physical properties of the hardware, it can be used to generate a hardware-intrinsic identity that represents the physical state of the system.

Referring to FIG. 3, high assurance processor 10, which is at the hardware layer, is established as the root-of-trust for the system and forms a layered security architecture interaction with application layer 11, operating system layer 12, network layer 13, root of trust layer 14, and hardware layer 15. The high assurance processor 10 addresses NIST SP 800-53 Rev. 4 ("Security and Privacy Controls for Federal Information Systems and Organizations") Security Capability, where trust is derived from interactions among system sub-components. The high assurance processor 10 may be used in mutual reinforcement controls within the system, where the high assurance processor 10 may validate an existing root-of-trust and vice versa.

The high assurance processor 10 is preferably designed to interact with the system through common commercial standard interfaces (e.g., USB, Ethernet) to enable interaction with commercial-off-the-shelf devices without hardware modification, and integration and continued support may be achieved through firmware and/or software upgrades. At root of trust layer 14 the high assurance processor 10 may be used to extend and/or interact with existing roots-of-trust (e.g., TPM, ARM TrustZone). This enables a system with an existing trusted boot process to remain essentially unchanged, as the high assurance processor 10 can first validate the existing root-of-trust (which can subsequently complete the existing trusted boot process). At application layer 11 the high assurance processor 10 may be used to validate applications prior to execution, for example by storing a cryptographic hash of the application code or binary executable when it is first installed from a trusted source. The high assurance processor 10 signs the cryptographic hash, which may be stored on the system. Before an application may be executed by the system, the high assurance processor 10 first computes a cryptographic hash of the current application code or binary executable, validates its signature on the stored cryptographic hash, and validates that the two hash outputs match. If any of these checks fail, the high assurance processor 10 preferably halts execution of the application and issues an alarm.

What is claimed is:

1. A system of components configured to attest integrity of the system, the components having a physical state and comprising:
  a) a physical unclonable function ('PUF') including a PUF input and a PUF output and constructed to generate, in response to the input of a specific challenge, an output value that is characteristic to i) the PUF, ii) the component's physical state, and iii) the specific challenge; and b) a processor connected to the PUF and configured to, in response to a verification request, provide an input to the PUF input and receive a response from the PUF output, and compute a share for a respective PUF-containing component of a joint threshold proof.

2. The device of claim 1, wherein a respective processor is further configured to convey the share it computes to a secretary.

3. The device of claim 1, wherein the system of components is arranged in a ring and one or more of the processors is configured to convey the share it computes to another component in the ring.

4. The device of claim 1, wherein the joint threshold proof is a zero knowledge proof.

5. A computing system having a high-assurance processor that provides the computing system a hardware root-of-trust, the computing system comprising:
a high-assurance processor that includes a physical unclonable function ('PUF'), and configured to use the PUF to generate a hardware-intrinsic identity representing the physical state of the computing system and to use the PUF as a root-of-trust for the computing system; and
multiple components and an operating system, wherein the computing system is configured to perform a trusted boot procedure starting with verification of the PUF and establishment of a corresponding minimal trust boundary and component-by-component verification following establishment of the minimal trust boundary.

6. The computing system of claim 5, wherein the PUF is configured to provide intrinsic hardware tamper detection.

7. The computing system of claim 6, wherein the computing system further comprises one or more software applications and the computing system configured to validate any software application prior to permitting its execution.

8. The computing system of claim 7, wherein the computing system is configured to store a signed cryptographic hash of any software application upon installation of the software application, the cryptographic hash being signed by the high-assurance processor using the PUF.

9. The computing system of claim 8, wherein the high assurance processor is configured to, upon requested execution of a software application, compute a cryptographic hash of the software application and validate its signature thereon.

10. The computing system of claim 5, further including an additional root-of-trust.

11. The computing system of claim 10, wherein the high-assurance processor is configured to validate the additional root-of-trust after verification of the PUF.

12. The computing system of claim 11, wherein the additional root-of-trust is a Trusted Platform Module.

13. A computing implemented method for component-by-component verification, the method comprising;
executing, by a high assurance processor having a physical unclonable function ('PUF'), a trusted boot procedure, wherein executing the trusted boot procedure includes:
verifying a hardware-intrinsic identity representing the physical state of the computing system using the PUF as a root-of-trust for the computing system;
establishing a corresponding minimal trust boundary on the computing system having multiple components and an operating system; and
verifying component-by-component following the act of establishing the minimal trust boundary.

14. The computing implemented method of claim 13, further comprising providing intrinsic hardware tamper detection by the PUF.

15. The method of claim 13, further comprising validating an additional root-of-trust, by the high-assurance processor, after verification of the PUF.

16. The method of claim 13, further comprising validating any software application prior to permitting execution of the software application on the computer system.

17. The method of claim 16, further comprising signing, by the high-assurance processor using the PUF, a cryptographic hash of the software application upon installation.

18. The method of claim 17, further comprising computing a cryptographic hash of the software application and validating a signature on the cryptographic hash, responsive to requested execution of a software application.

* * * * *

UNITED STATES PATENT AND TRADEMARK OFFICE
CERTIFICATE OF CORRECTION

PATENT NO. : 9,715,590 B2
APPLICATION NO. : 14/704947
DATED : July 25, 2017
INVENTOR(S) : Douglas J. Gardner et al.

Page 1 of 1

It is certified that error appears in the above-identified patent and that said Letters Patent is hereby corrected as shown below:

At Column 12, Lines 13 through 14, Claim 13, please change: "component-by-component verification, the method comprising;" to -- component-by-component verification, the method comprising: --.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*